United States Patent [19]

Tsai

[11] Patent Number: 4,995,675
[45] Date of Patent: Feb. 26, 1991

[54] BICYCLE WHEEL AND THE MANUFACTURING METHOD

[76] Inventor: Carlos Tsai, No. 91-4, Sec. 4, Mei Chuan E. Rd., Taichung City, Taiwan

[21] Appl. No.: 378,830

[22] Filed: Jul. 12, 1989

[51] Int. Cl.⁵ .............................................. B60B 5/02
[52] U.S. Cl. ................................ 301/63 PW; 301/95; 301/104
[58] Field of Search ................. 301/63 PW, 54, 64 R, 301/67, 74, 95–98, 104, 105 B

[56] References Cited

U.S. PATENT DOCUMENTS

| | | | |
|---|---|---|---|
| 1,543,774 | 6/1925 | Ibach | 301/104 |
| 3,656,531 | 4/1972 | Ross et al. | 301/63 PW X |
| 4,252,378 | 2/1981 | DeBolt et al. | 301/63 PW X |
| 4,314,964 | 2/1982 | Ferrary | 301/63 PW X |
| 4,511,184 | 4/1985 | Schauf et al. | 301/63 PW X |
| 4,793,659 | 12/1988 | Oleff et al. | 301/63 PW |

FOREIGN PATENT DOCUMENTS 0074701  4/1987  Japan ..................... 301/104

*Primary Examiner*—Russell D. Stormer
*Attorney, Agent, or Firm*—Bernard R. Gans

[57] ABSTRACT

A bicycle wheel includes a rim having three or four spokes. A hub with a bearing is disposed at the center of said wheel. An annular recess is formed on an outer peripheral surface of rim for receiving a tire. A compartment is formed within each spoke for containing foam material and an annular chamber is formed within the rim of the wheel.

The steps of manufacturing the bicycle wheel comprising:

preparing a mold having a compartment configured according to the bicycle wheel, the mold including an upper mold and a lower mold;
laminating composite material prepreg;
applying foam material and solvent material respectively within spoke part and rim part of the composite material prepreg;
disposing the composite material prepreg into the compartment of the mold;
covering and inserting said mold into a heating appliance and heating;
removing and cooling the mold;
releasing the wheel and drilling a hole to the rim of the wheel for releasing the gas within the rim.

4 Claims, 4 Drawing Sheets

4,995,675

BICYCLE WHEEL AND THE MANUFACTURING METHOD

FIELD OF THE INVENTION

The present invention relates to a bicycle wheel, and more particularly to a bicycle wheel which incorporates composite materials.

BACKGROUND OF THE INVENTION

Bicycles have been widely used for exercises and contests for a long time. But, conventional bicycle wheels with wire spokes have high wind resistance which is not good for racing. Therefore, a disc wheel was developed and used in the Olympic Games of Los Angeles in 1984. This type of wheel is good for an indoor contest only because side wind seriously affects this wheel; and generally, indoor wind speed is very low. Therefore, a bicycle having streamline shape, low wind resistance, light weight and high rigidity is highly desired. For these purposes, the manufacturers in the art have sought to apply composite materials, such as carbon fiber or the like to the wheels, but no such products have been succeeded so far.

The present invention has arisen to mitigate and/or obviate the afore-described disadvantages of the conventional bicycle wheel and seeks to provide a wheel having streamline shape, low wind resistance, light weight and high rigidity.

SUMMARY OF THE INVENTION

The primary object of the present invention is to provide a bicycle wheel having a streamline shape, low wind resistance, light weight and high rigidity.

Another object of the present invention is to provide a method of manufacturing the bicycle wheel.

The present invention seeks to provide a bicycle wheel and a method of manufacturing the same. The bicycle wheel is generally composed of a rim with three spokes formed therein. An annular chamber is formed within the rim of the wheel and a compartment is formed within each spoke for containing foam materials. An annular recess is formed on the outer peripheral surface of the rim for receiving a tire.

The method of manufacturing the bicycle wheel comprises the steps of: preparing a mold with a compartment formed therein; laminating the composite material prepreg and applying adhesive material between the adjacent layers; applying foam material and solvent material respectively within the spoke part and the rim part of the composite material prepreg; covering and inserting the mold into a heating appliance and heating; removing and cooling the mold; releasing the wheel; drilling a hole to the rim of the wheel for releasing the gas produced therein; and finishing.

Further objects and advantages of the present invention will become apparent from a careful reading of the detailed description provided hereinbelow, with appropriate reference to the accompanying drawings.

DETAILED DESCRIPTION OF THE INVENTION

Figure 1:
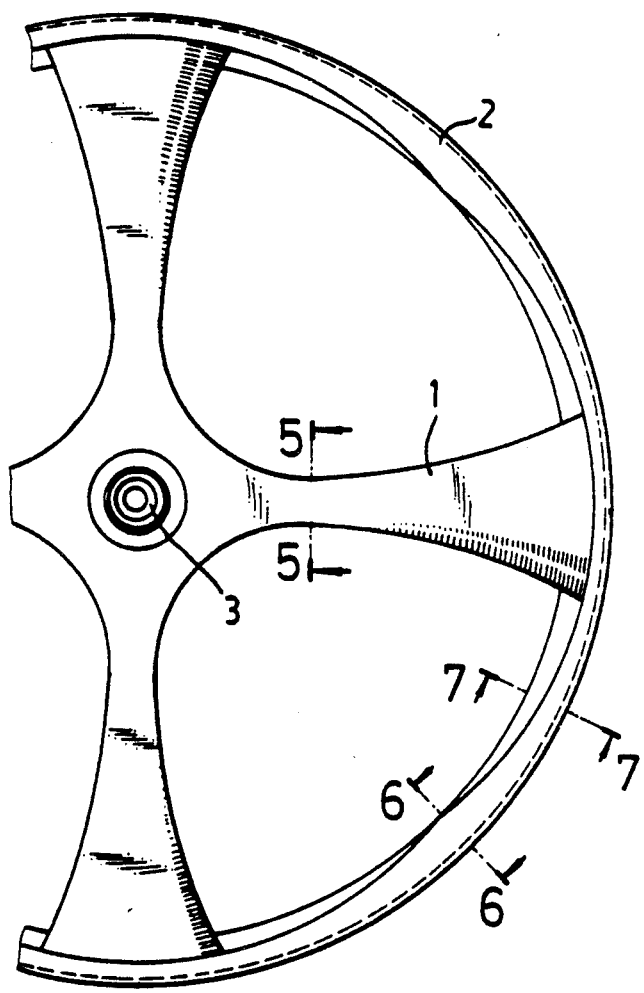
FIG. 1 is a partial cross-sectional view showing one half of a bicycle wheel in accordance with the present invention.
Figure 2:
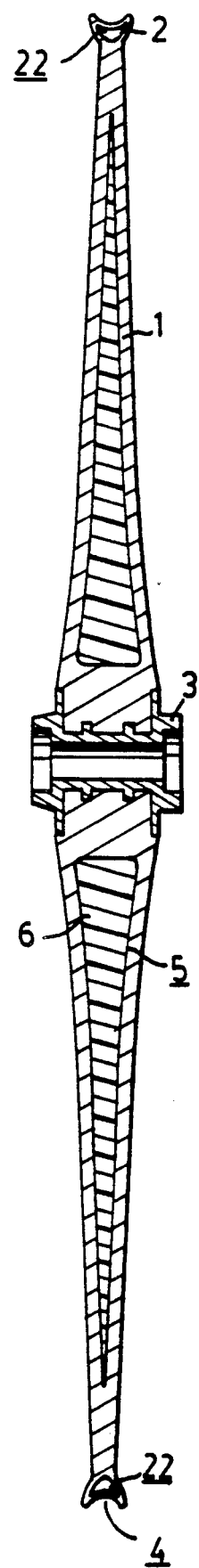
FIG. 2 is a cross-sectional view of the bicycle wheel of FIG. 1.
Figure 3:
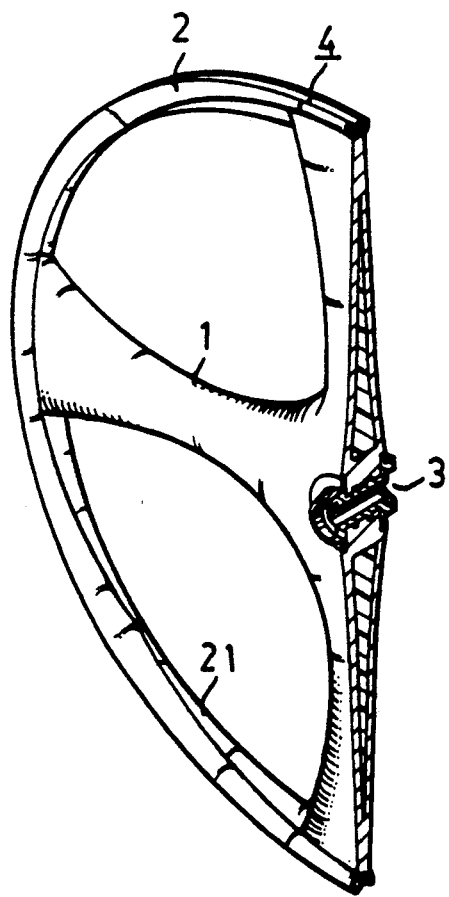
FIG. 3 is a perspective view of the bicycle wheel of FIG. 1.
Figure 8:
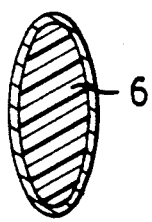
FIGS. 8, 9, 10 are cross-section views taken along lines 8—8, 9—9, 10—10, respectively, of FIG. 4.
Figure 9:
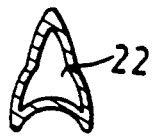
Figure 10:
Figure 4:
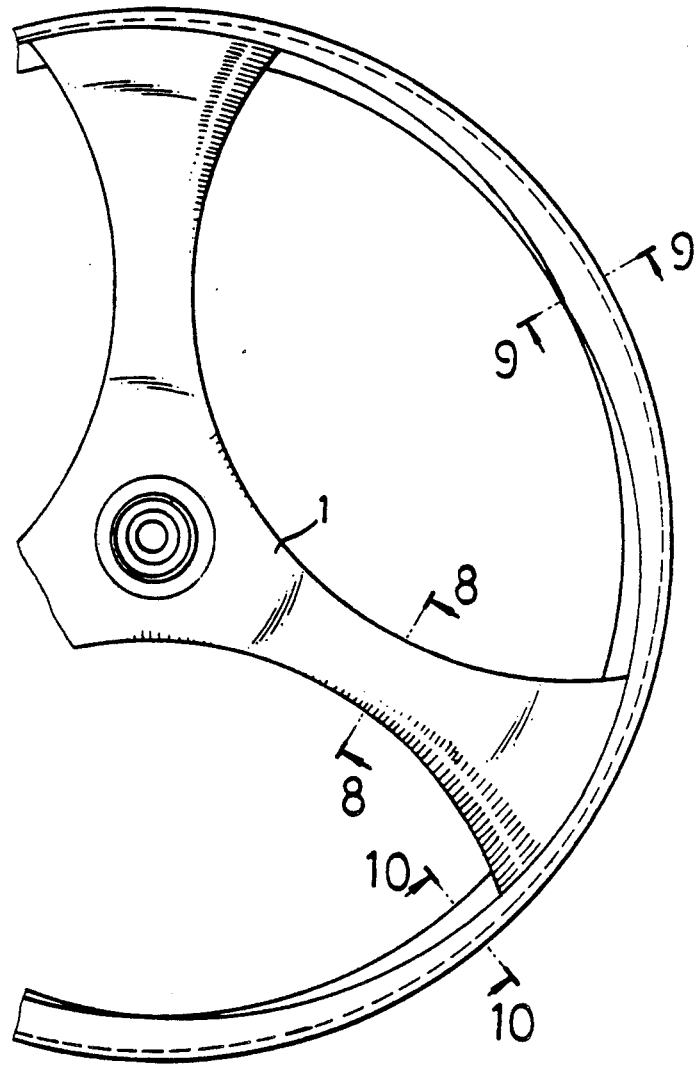
FIG. 4 is a partial cross-sectional view similar to FIG. 1 showing another embodiment in accordance with the present invention.

Referring to the drawings and initially to FIGS. 1, 2 and 3, the wheel in accordance with the present invention is generally composed of a rim 2 having four spokes 1 and a hub 3 fixed in the center thereof. An annular recess 4 is formed on the outer peripheral surface of the rim 2 for receiving a tire (not shown).

Figure 5:
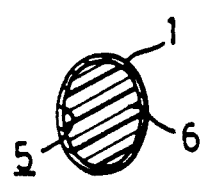
FIGS. 5, 6, 7 are cross sectional views taken along lines 5—5, 6—6, 7—7, respectively, of FIG. 1.
Figure 6:
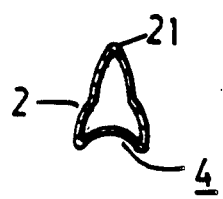
Figure 7:
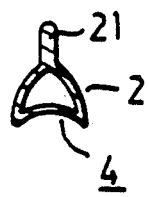

Normally, the hub 3 is made of metal. Alternatively, the hub 3 could be an integral part of the spokes 1 with a bearing (not shown) disposed therein. The cross section of the spoke 1 is substantially an ellipse (FIG. 5). After stress analysis, from the end near the hub 3 to the end near the rim 2, the width of the spoke 1 preferred changes gradually smaller and then gradually wider. A rib 21 is formed in the inner peripheral side of the rim 2. The width of the rib 21 is thicker at a substantially middle position between the adjacent spokes 1 (FIG. 6), and gradually becomes thinner in both directions toward the spokes 1 (FIG. 7). A compartment 5 is formed within the spokes 1 for containing foam material 6 therein.

Alternatively, referring next to FIGS. 4, 8, 9, and 10, if the diameter of the rim 2 is smaller than twenty four inches, three spokes 1 are used in the wheel in accordance with the present invention. The cross section of the spoke 1 is a slender ellipse as compared with the ellipse shown in FIG. 1. Certainly, three spokes wheel is also suitable for a wheel with a diameter more than twenty four inches, if the structure of the wheel is reinforced.

TABLE 1

| PERFORMANCE | MATERIALS | | |
| --- | --- | --- | --- |
| | CARBON FIBER | MEDIUM CARBON STEEL | ALUMINUM ALLOY |
| (A) TENSIL STRENGTH KG/CM**3 | 16.2E3 | 5.6E3 | 3.1E3 |
| (B) SPECIFIC WEIGHT G/CM**3 | 1.50 | 7.8 | 2.7 |
| (A) / (B) | 11.2E3 | 7.2E3 | 11.5E3 |
| (A) / UNIT WEIGHT | 100 | 6.4 | 10.3 |
| THICKNESS RATIO (A) = CONSTANT | 1 | 2.9 | 5.2 |
| WEIGHT RATIO (A) = CONSTANT | 1 | 15.6 | 9.7 |

The wheel in accordance with the present invention is substantially made of composite material, such as carbon-fiber, glass-fiber or boron-fiber etc. Table 1 shows a comparison among carbon-fiber material, medium carbon steel and aluminum alloy. From the Table we can see that the carbon-fiber material is much lighter than the other materials while maintaining even better strength.

The steps for manufacturing the wheel including:

(1) preparing a mold (not shown) having a predetermined shaped compartment provided therein according to the shape of the wheel to be manufactured, generally the mold having an upper mold and a lower mold;

(2) laminating composite material prepreg with various fiber directions within the compartment of the lower mold, inserting the bearing or hub into position and applying adhesive materials between the adjacent layers of the composite material prepregs; the different fiber directions between the adjacent prepregs increasing the strength of the wheel;

(3) applying foamable materials within the prepreg of the spokes 1 and applying solvent materials, such as methylene chloride or toluene etc., within the prepreg of the rim 2; so that the foamable materials are contained within the spokes 1, and the solvent materials are contained within the rim 2;

(4) covering with the upper mold and inserting into a heating appliance for applying heat to the whole set of the mold; both foamable materials and solvent materials being thermal expandable such that the spokes 1 and the rim 2 are urged into shapes, inwhich the solvent materials change from liquid to gas thereby increasing the pressure within the rim 2;

(5) removing and cooling the mold;

(6) releasing the wheel;

(7) drilling a hole to the rim for escaping the gas produced therein from the solvent materials; and (8) finishing.

Accordingly, the present invention has the following advantages:

(a) The whole wheel including spokes 1, hub 3, and rim 2 is formed integrally at the same time such that the manufacturing processes are simplified tremendously;

(b) The foam materials within the spokes 1 absorb a large part of the vibrations of the wheel;

(c) The spokes 1 are streamline shaped;

(d) The strength of the wheel is higher, whereas, the weight of the wheel is much smaller than a conventional wheel.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle wheel generally comprising a rim having at least three spokes and a hub formed at a center of said wheel; an annular recess being formed on an outer peripheral surface of said rim for receiving a tire; a compartment being formed within each said spoke for containing foam material; and a rib being formed on an inner peripheral surface of said rim, said rib changing, from a substantial medium position between two adjacent spokes on both directions toward the spokes, from wider to thinner.

2. A bicycle wheel according to claim 1, wherein said spoke has a substantial ellipse cross section.

3. A bicycle wheel according to claim 1, wherein a width of said spoke changes, from an end near said hub to an end near said rim, gradually smaller and then gradually larger.

4. A bicycle wheel according to claim 1, wherein three spokes are used if the diameter of said rim is smaller than twenty four inches.

* * * * *